United States Patent Office 2,801,826
Patented Aug. 6, 1957

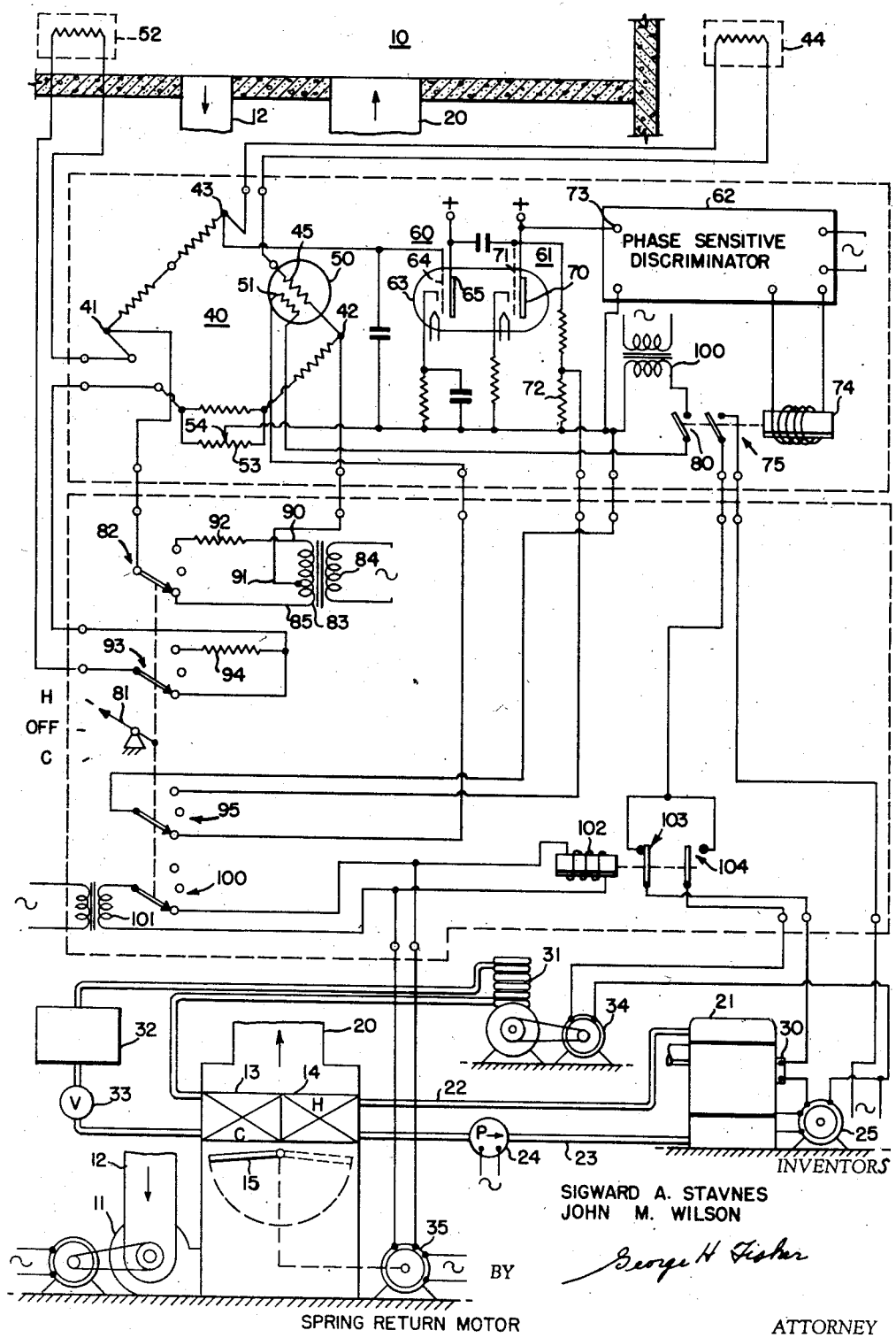

2,801,826

CONTROL APPARATUS

Sigward A. Stavnes, St. Paul, and John M. Wilson, Minneapolis, Minn., assignors to Minneapolis-Honeywell Regulator Company, Minneapolis, Minn., a corporation of Delaware Application October 8, 1954, Serial No. 461,183

6 Claims. (Cl. 257—3)

The present invention is concerned with air conditioning control apparatus in particular an electrical network having a bridge containing a temperature responsive resistor, an amplifier, and a relay for controlling temperature changing apparatus, there being provisions for selectively reversing the bridge so that the same control apparatus can be used on both heating and cooling.

With the present advances in residential air conditioning apparatus there is a need for a high quality electronic temperature control apparatus for controlling the temperature in a dwelling both during periods of cooling and heating. To minimize the amount of control apparatus needed the present invention provides for the use of a single bridge, of a type disclosed in U. S. Patent No. 2,572,293, issued October 23, 1951, amplifier and relay combination to control both heating and cooling by modifying the combination upon switch-over from heating to cooling or vice versa.

It is therefore an object of the present invention to provide an improved control apparatus for selectively controlling the operation of either cooling or heating apparatus.

Another object of the present invention is to provide in a bridge network circuit of a temperature control apparatus means for reversing the effect of the unbalance of the bridge in one direction on the operation of an associated relay so that upon connecting either heating or cooling apparatus to be controlled by the relay the temperature control apparatus is adapted to control either the one or the other.

Another object of the present invention is to provide in a bridge network circuit of a temperature control apparatus an initially high voltage to break down contact resistance in the main power switch, the voltage being reduced when contact is made by voltage reduction apparatus.

Still another object of the present invention is to provide in a temperature control apparatus for use with both heating and cooling apparatus a reduction in the gain of the control apparatus so that a wider differential of operation is available when controlling cooling apparatus.

These and other objects of the present invention will become apparent upon a study of the following specification of which the single drawing is a schematic showing of the temperature control apparatus controlling either heating or cooling apparatus depending upon the manual selector position.

Referring to the figure the temperature control apparatus is shown for illustrative purposes controlling a temperature conditioning system of a forced air type in which the temperature in the space 10 which might be a residential dwelling is controlled by circulating conditioned air by means of a fan 11. The fan pulls air from space 10 through a return duct 12 and forces it through either a cooling coil 13 or a heating coil 14, depending upon the position of the damper 15, into the space by means of a supply duct 20. Heating coil 14 is supplied with hot water from a conventional hot water boiler 21 through supply pipe 22, the water returning to the furnace through return pipe 23 under the power of pump 24 shown connected to a source of power. Furnace 21 receives heat from a burner 25 connected to a source of power through a limit switch so that when the temperature of the boiler becomes excessive the burner will be shut off.

Cooling coil 13 receives refrigerant from a conventional refrigeration system having a compressor 31, tank 32, and an extension valve 33. Compressor 31 is driven by a motor 34 connected to a source of power. Damper 15 is controlled by a spring return motor 35 so that when electrical power is supplied to the motor the damper is moved in a direction to block the passage of air through the cooling coil (as shown); however, when the motor power circuit is broken the damper will return to a position to block the passage of air through the heating coil.

A bridge network circuit 40 has a pair of terminals 41 and 42 to which two branch circuits are connected; the first branch having an output terminal 43, a temperature responsive resistance element 44 positioned outside of the dwelling to be responsive to the outdoor temperature, and a second temperature responsive resistance element 45 contained in a cycler unit 50 also containing a heater 51 for providing heat anticipation to bridge circuit 40 when it is used to control the heating apparatus. A second branch has a temperature responsive resistance element 52 responsive to the internal temperature of the dwelling, and a calibration potentiometer 53 having an output wiper 54.

The output of bridge network 40 as obtained between terminal 43 and wiper 54 is connected to the input of a conventional amplifier having at least two stages of amplification 60 and 61 and phase sensitive discriminator stage 62. Amplification stages 60 and 61 comprise a conventional electron discharge device or suitable amplification means 63 having an input controlled electrode 64 to which terminal 43 is connected. A pair of anodes or plates 65 and 70 are connected to a source of voltage (not shown). The gain of the second stage of amplification is controlled by the amount of resistance connected between the controlled electrode 71 and ground and is reduced by the shorting out of a resistor 72 whenever the temperature control apparatus is used during cooling. The output of amplification stage 61 is connected to the input terminal 73 of discriminator 62, it being a sort disclosed in the Albert P. Upton U. S. Patent 2,423,534, issued July 8, 1947, in particular in Figure 2. In the present invention only one relay 74 is connected to the output of the phase sensitive discriminator 62. Relay 74 controls the operation of switch 75, connected into the control circuit for either burner 25 or compressor 31, and switch 80.

A series of switches are connected in gang to a single manual operator 81 for selectively connecting the temperature control apparatus in heating, cooling and off positions. A first switch 82 controls the power source to bridge network circuit 40 as received from secondary 83 of a transformer having its primary 84 connected to a source of voltage. Secondary 83 has a pair of end terminals 85 and 90 and a tap 91 which is positioned so that the output voltage between end terminal 90 and tap 91 is greater than the output between end terminal 85 and tap 91. Tap 91 is connected to terminal 42 of the bridge circuit and the movable member of switch 82 when manual operator 81 is in the heating position connects end terminal 85 to terminal 41 of the bridge circuit. Thus the voltage between end terminal 85 and tap 91 is applied to bridge network circuit 40; however, when operator 81 is moved to a cooling position switch 82 connects terminal 41 to end terminal 90 through a voltage dropping resistor 92. The size of the components are selected so that a higher voltage is applied to bridge 40 during heating to increase the bridge sensitivity. The phase of the voltage now applied to the bridge for cooling operation is reversed from that of the heating operation so that an unbalance of the resistance elements 44 and 52 must be in the opposite direction to produce the same results in the remaining part of the control apparatus, especially in the operation of relay 74. While the output between tap 91 and end terminal 90 is larger than the output between tap 91 and end terminal 85, the dropping resistor 92 subtracts from the transformer voltage so that a smaller voltage is applied to the bridge between terminals 41 and 42, this reducing the bridge sensitivity. Should the cooling contact of switch 82 become corroded or dusty during the long winter months when the switch is in a heating position, the initial high open circuit voltage of the transformer assists in breaking any contact resistance existing to insure that the power from transformer winding 83 is connected to the bridge network circuit. As the normal operating voltage for the bridge 40 is less on cooling control than heating, a means of breaking the contact resistance was found necessary. Any contact resistance on the heating contact of switch 82 would be exposed to a higher voltage and thus more readily broken down. When operator 81 is in the center position switch 82 is open to cut off all power to bridge network circuit 40 rendering the temperature control apparatus ineffective.

The second switch 93 is connected in series with temperature responsive element 52 and provides for the addition of a resistor 94 to the second branch of bridge network circuit 40 when the manual operator 81 is placed in a cooling position. Resistor 94 modifies bridge network circuit 40 upon a transfer to cooling so that the same control point is used for both heating and cooling. For example, let us assume that during the heating operation with a predetermined outdoor temperature and the room thermostat or element 52 at a temperature of 70 degrees Fahrenheit relay 74 would be energized to turn on the heating apparatus. With a two degree differential the relay would be deenergized when the room temperature reached 72. When the bridge power supply was reversed for the cooling operation the control point would shift especially if the gain of the amplifier were changed so as to bring the control point of relay 74 substantially back to where it was during the heating period, the bridge must be modified by the addition of resistor 92 in the thermostat branch. When switch 92 is in a center position the thermostat branch is open.

A third switch 95, with manual operator 81 is in the heating position, connects the cycler heater 51 through switch 80 to a source of power 100 so that upon the operation of relay 74 cycler 50 is heated to provide the conventional heat anticipation normally needed in a temperature control apparatus of this sort. When manual operator 81 is in the cooling position, switch 95 opens the cycler heater circuit and shunts resistor 72 in the amplification stage 61 to reduce the gain of the amplifier and thereby increase the differential of relay 74 when it is controlling the cooling apparatus. An increased differential during cooling is desirable to eliminate short running cycles of compressor 31.

A fourth switch 100 connects a source of power 101 to a relay 102, when the manual operator 81 is in the heating position. Relay 102 has a first switch 103 that is closed when relay 102 is energized to connect a source of power through switch 75 to the burner 25 when the temperature control apparatus calls for heat. A second switch 104 is normally closed when relay 102 is deenergized to connect compressor motor 34 through switch 75 to the source of power. Switch 100 also controls the power to damper motor 35 so that when manual operator is in the heating position motor 35 is energized to hold damper 15 in front of cooling coil 13 so that the air circulating through the heating system must pass through the heating coil.

*Operation*

As shown the temperature control apparatus is connected for heating. However, the temperature in space 10 is satisfied and responsive element 52 has balanced the bridge in a manner to cause deenergization of relay 74 to shut off burner 25 and thus no heat is added to the air as it continuously circulates through coil 14 into space 10. When the temperature in space 10 decreases the resistance of element 52 will decrease to unbalance bridge circuit 40 causing energization of relay 74. Switch 75, upon closing, starts burner 25 so that hot water is furnished to coil 14 and thus heat to the space 10. At the same time that relay 74 is energized the cycler heater 51 is also energized to heat up element 45 balancing the bridge in a direction which would be normally done when thermostat 52 was satisfied. This would cause deenergization of relay 74 sooner than would be normally done without the cycler thereby providing for heat anticipation to prevent overshooting of the temperature above the desired control point in space 10.

With gang switch operator 81 in the heating position the damper motor 35 is energized and damper 15 prevents air from passing through cooling coil 13. After the normal heating period is over and the cooling period begins manual operator 81 would be moved to the cooling position and the switches 82, 93, 95 and 100 would be repositioned. Switch 82 would reverse the phase of the voltage that was applied to bridge network circuit 40 and as the voltage output of secondary winding 83 between teminal 90 and tap 91 is greater than the normal voltage to be supplied to the bridge network circuit the initial high voltage would exist across the contacts of the switch 82 to break down any contact resistance which exists due to dust or tarnish coming about by the long period of inactivity of switch 82 during the heating season. Resistor 92 would drop the voltage as soon as contact was made so that a lower voltage was applied to the bridge network circuit 40. The reversal of the voltage to the bridge network circuit reverses the effectiveness of thermostat 52, as well as outdoor thermostat 44, on the operation of relay 74. Now on an increase in the space temperature above the control point the increase in the resistance of thermostat 52 would cause an unbalance of bridge 40 in a direction to cause energization of relay 74.

To provide for the same control point or temperature maintained in space 10 during both heating and cooling the addition of resistor 94 to the thermostat leg of network circuit 40 is necessary upon the reversal of the phase of the voltage that is applied to the bridge through switch 82. While the gain of the amplifier is reduced for the cooling operation the control point is the same; however, a wider variation in the space temperature may exist during cooling as the differential of the relay 74 is increased to provide for longer periods of operation of the cooling apparatus. The gain of the amplifier is reduced by the shunting of resistor 72 when switch 95 is moved upward during the selected cooling operation. At the same time the cycler heater is rendered ineffective. Switch 100 upon movement of manual operator 81 to the cooling position deenergizes the damper motor and a spring return (not shown) positions damper 15 so that now air must pass through cooling coil 13. Switch 100 also deenergizes relay 102 so that burner 25 is disconnected and now operation of relay 74 initiates operation of compressor motor 34 to furnish refrigerant to the cooling coil 13.

While the temperature control apparatus is shown with a conventional forced air heating system using hot water for heating for a conventional refrigeration system for cooling, it is obvious that any sort of heat furnishing means or cooling means could be adapted for use with the present invention, therefore the inven-

I claim:

1. In temperature control apparatus for controlling space temperature during periods requiring either heating or cooling; a bridge circuit having a pair of terminals to which a plurality of branch circuits are connected, a first circuit having a temperature responsive resistance means responsive to space temperature and an output terminal, a second circuit having a temperature responsive resistance means responsive to outdoor temperature and a second output terminal; first switch means; first and second power source; first connection means including said switch means when in a first position for connecting said pair of terminals to said first power source; voltage dropping means; second connection means including said switch means when in a second position and said voltage dropping means for connecting said pair of terminals to said second power source, said second power source having a voltage level so that with said voltage dropping means in the circuit the voltage delivered to said pair of terminals is normal thus upon the initial closing of said switch means in said second position to connect said second source there is available a relatively high voltage level to break down any contact resistance existing in said switch means when in said second position; amplification means; relay means having actuating means and a switch actuated thereby; connection means connecting said bridge circuit, said amplification means, and said actuating means in the order named thereby the output of said bridge circuit is effective to control the operation of said relay means; first temperature changing means for cooling, second temperature changing means for heating; second switch means for connecting either said cooling means or said heating means to said switch of the relay means; third switch means; means including said third switch means associated with said amplification means for changing the gain of said amplification means; fourth switch means; a resistor; means including said fourth switch means for adding said resistor to said second circuit to change the bridge calibration when transferring from heating to cooling operation; and means for manually operating said first, second, third and fourth switch means simultaneously to change over from heating to cooling operation, or vice versa.

2. In air conditioning control appartus, heating apparatus, cooling apparatus, a network circuit having temperature responsive means responsive to space temperature, a power supply, switch means, circuit means including said switch means for connecting said power supply to said network circuit, relay means, said relay means having an actuator and a switch actuated thereby, means including said switch for controlling the operation of either said heating apparatus or said cooling apparatus depending on which is connected thereto, and connection means connecting said network circuit in a controlling relation to said relay actuator, said switch means being adapted to reverse said power supply with respect to said network circuit to obtain a reverse effect of the dropping of the space temperature below a desired temperature upon said relay means.

3. In air conditioning control apparatus for use in controlling heating and cooling apparatus, a network circuit having a temperature responsive means responsive to space temperature connected thereto, switch means, a power source, circuit means including said switch means connecting said source to said bridge circuit, switching means having an actuator, circuit means connecting said bridge network circuit in a controlling relation to said actuator, said switching means being adaptable to control either the heating or the cooling apparatus depending upon which is connected thereto, said switch means being adapted to reverse said source with respect to said network circuit and thus reverse the effect of said temperature responsive means upon the operation of said switching means so that when the heating apparatus is connected thereto a drop in space temperature below a predetermined value initiates operation of the heating apparatus and when the cooling apparatus is connected thereto an increase in space temperature above predetermined value initiates operation of the cooling apparatus.

4. The air conditioning control apparatus, heating means, cooling means, a bridge circuit having a plurality of branch circuits connected to a pair of terminals, a first branch circuit having temperature responsive means responsive to space temperature, amplification means, relay means having an actuator and a switch operated thereby, circuit connection means connecting said bridge circuit, said amplification means, and said relay actuator in the order named, a source of power having a first and second terminals and an inbetween tap, switch means, circuit means connecting said tap to one of said pair of terminals, circuit means including said switch means for selectively connecting said other of said pair of terminals to either said first or second terminal of said surce of power, and further means including said switch means connecting either said heating or said cooling means to said switch of the relay means.

5. In a temperature control apparatus, cooling means, heating means, temperature responsive means, network circuit means having said temperature responsive means connected thereto, relay means having an energization portion and a switching portion, amplification means, circuit means including said amplification means connecting said network circuit means to said energization portion, a source of power, switch means having a first, second and third portions, circuit means including said first portion of the switch means connecting said source of power to said network circuit means so that the effect of an increase in temperature above a predetermined value can either energize or de-energize said relay means, circuit means including said second portion of the switch means for connecting either said heating means on said cooling means to said switching portion, and circuit means including said third portion for changing the gain of said amplification means whenever a change from heating to cooling operation is made.

6. In control apparatus adapted for use in the control of an air conditioning system to selectively control heating and cooling apparatus, a power source, a bridge circuit having temperature responsive means, circuit means connecting said power source to said circuit, relay means, said relay means having an energizing winding and a switch controlled thereby, said switch being adapted to selectively control either the heating apparatus or the cooling apparatus depending upon which is connected thereto, means connecting said network circuit to said energizing winding to control said relay means, said winding being normally energized when the temperature of the space is above a predetermined value, and means associated with said circuit means for reversing said power source thereby reversing the effect of said bridge network circuit on said relay means so that said relay means is deenergized when the temperature of the space is above said predetermined value.

References Cited in the file of this patent

UNITED STATES PATENTS

| | | |
|---|---|---|
| 2,366,500 | Eastin | Jan. 2, 1945 |
| 2,595,644 | Davis | May 6, 1952 |